United States Patent [19]

Okumura

[11] Patent Number: 4,907,445
[45] Date of Patent: Mar. 13, 1990

[54] AUTOMOBILE WHEEL BEARING UNIT

[75] Inventor: Tsuyoshi Okumura, Osaka, Japan

[73] Assignee: Koyo Seiko Co., Ltd., Osaka, Japan

[21] Appl. No.: 291,303

[22] Filed: Dec. 28, 1988

[30] Foreign Application Priority Data

Dec. 28, 1987 [JP] Japan .................. 62-333752

[51] Int. Cl.⁴ .......................................... G01M 19/00
[52] U.S. Cl. .................................................. 73/118.1
[58] Field of Search ............... 73/118.1; 324/173, 179, 324/174; 303/93

[56] References Cited

U.S. PATENT DOCUMENTS 3,683,219 8/1972 Kruse .............................. 324/174 X
4,797,612 1/1989 Nakanishi et al. .................. 324/173

FOREIGN PATENT DOCUMENTS 2133955 12/1972 France .
2365055 4/1978 France .
835020 5/1960 United Kingdom ............... 324/174
1353306 5/1974 United Kingdom .
1566067 4/1980 United Kingdom .

Primary Examiner—Jerry W. Myracle
Attorney, Agent, or Firm—Wenderoth, Lind & Ponack

[57] ABSTRACT

An automobile wheel bearing unit has an external member to be mounted on the chassis of an automobile, an internal member on one end of which is mounted a wheel, rolling elements interposed between the external member and the internal member, and a cage. The internal member is rotatably mounted to the external member via the rolling elements by a nut. An annular member having a plurality of projections on an end surface thereof is mounted on the other end of the internal member opposite to the end thereof to which the wheel is mounted, and rotates in conjunction with the internal member. The nut and annular member are covered with a sealing member mounted on the external member. A rotational detector is mounted to the sealing member, and positioned between an inner peripheral surface of the sealing member and an outer peripheral surface of the nut so as to face the projections of the annular member and detects a rotational speed of the annular member. The rotational detector so sealed can detect the rotational speed with good precision over an extended period.

6 Claims, 7 Drawing Sheets

AUTOMOBILE WHEEL BEARING UNIT

BACKGROUND OF THE INVENTION

The present invention relates to an automobile wheel bearing unit of the kind including rolling elements, a cage, an external member to be mounted to a chassis of an automobile, an internal member to be connected with a wheel, an annular member mounted on and turning in conjunction with said internal member, and a rotational speed detector which detects a rotational speed of said annular member.

In some automobiles, a rotational velocity of each wheel is detected with a rotational speed detector and the operation of the brake cylinders is controlled according to the velocity of each wheel in order to prevent the wheels from locking when the brakes are suddenly applied on a frozen road surface.

Such a rotational speed detector as is known from the prior art is shown in FIG. 11. This wheel bearing unit comprises an inner ring 51 mounted on axle end 50 laterally projecting from a chassis as an idler, cage 52 fit over inner ring 51 and holding multiple rolling elements 53, an outer ring 55 to which is mounted wheel 54 and which is free to move around said rolling elements 53, pulser 56 which comprises a powerful magnetic body fit over said outer ring 55 and secured to ring 55 at the side thereof opposite wheel 54 and which has gear tooth-like projections extending at the circumference thereof, and speed sensor 57 which is mounted on the chassis at the base of axle end 50. A minimal gap is provided between the outer circumference of pulser 56 and speed sensor 57 which has a built-in permanent magnet and coil. When pulser 56 rotates in conjunction with wheel 54, magnetic flux emanating from the permanent magnet of speed sensor 57 is varied by the gear tooth-like projections on the outer circumference of said pulser, thus generating an AC voltage of a frequency proportional to the rotational speed of said pulser in the coil; it is therefore possible to obtain the rotational speed of wheel 54 by thus detecting the frequency of this AC voltage.

However, according to the conventional automobile wheel bearing unit, speed sensor 57 is mounted at the base of axle end 50 so as to project from protective cover 58 on the chassis. Thus, grit, mud, water and other foreign substances are able to penetrate to a detector head of speed sensor 57 as shown by arrow A through a gap between said protective cover 58 and brake shoe 59 mounted on wheel 54, thereby resulting in corrosion and damage to said detector head. Furthermore, such grit, water and other foreign substances may damage the teeth on the circumference of pulser 56, and may clog the gaps between said teeth, thus causing in either case a major problem of the loss of the ability of detect with good precision the rotational speed of the wheel.

SUMMARY OF THE INVENTION

The object of the present invention is therefore to provide a compact, lightweight automobile wheel bearing unit equipped with a wheel rotational speed detector of the kind which is free from being damaged by the penetration of grit, water and other foreign substances and which therefore enables a detection of the rotational speed of the wheel with good precision over an extended period.

To achieve the aforementioned object, an automobile wheel bearing unit according to the present invention has an external member to be mounted on a chassis of an automobile, an internal member on one end of which is mounted a wheel, rolling elements interposed between the external member and internal member, and a cage, and characterized by a nut mounting the internal member to the external member via the rolling elements in such a manner that the internal member can rotate freely, an annular member which is mounted on the other end of the internal member opposite to the end thereof to which the wheel is mounted, and which rotates in conjunction with the internal member, a sealing member mounted on the external member and covering the nut and annular member, and a rotational detector positioned between an inner peripheral surface of the sealing member and an outer peripheral surface of the nut, mounted on the sealing member so as to face an end of the annular member, and which detects a rotational speed of the annular member.

Preferably, multiple projections are disposed at a regular interval and in a radiating pattern over the circumference of the annular member facing the rotational detector.

The rotational detector mounted to the chassisside mounting member detects the rotation of the annular member mounted on the wheel-side rotating member of the automobile wheel bearing unit.

The sealing member prevents the penetration of grit, muddy water, or the like into the unit of the rotational detector and annular member. Furthermore, because the annular member is mounted to the internal member, and the rotational detector is positioned between the inner peripheral surface of the sealing member and the outer peripheral surface of the nut, and is mounted to the sealing member opposite the end surface of the annular member is taken in the axial direction of the unit, the rotational detector does not extend to the outside of said sealing member, and can be designed to be smaller and weigh less than the prior art detector.

BRIEF DESCRIPTION OF THE DRAWINGS

The present invention will become more fully understood from the detailed description below and the accompanying drawings which are illustrative only, and thus are not limitative of the present invention, and wherein.

DETAILED DESCRIPTION THE PREFERRED EMBODIMENTS

Figure 1:
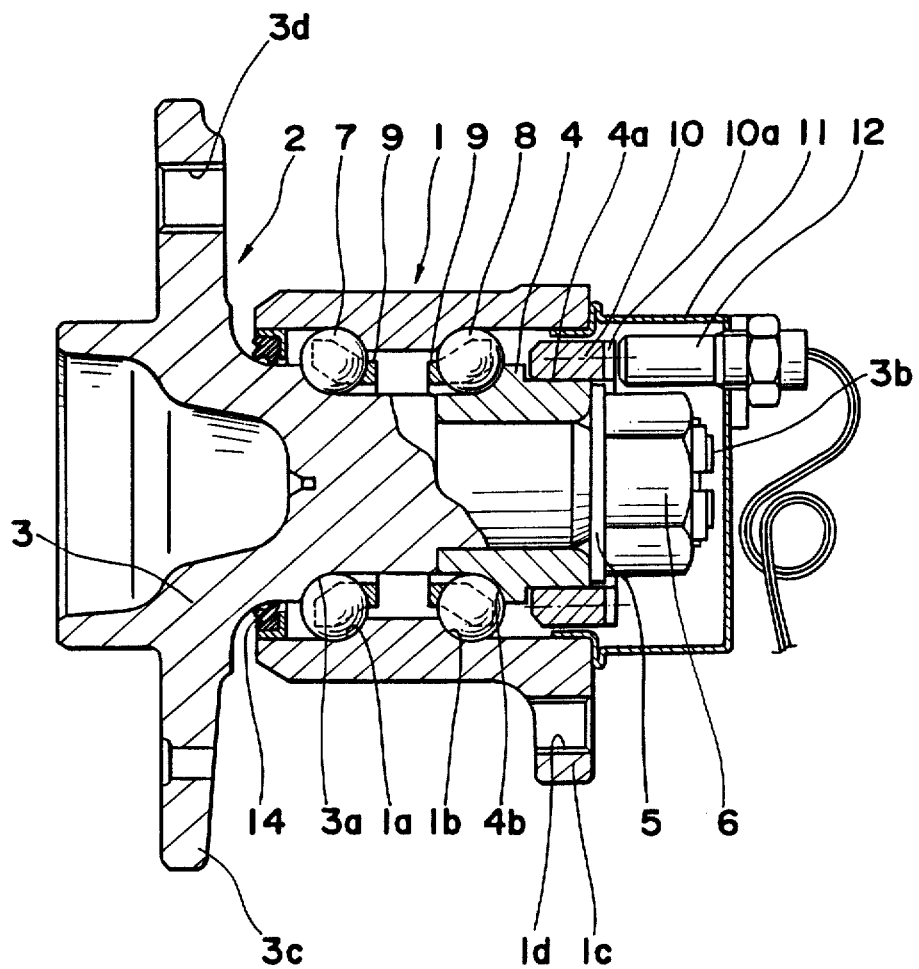
FIGS. 1 and 2 are a vertical cross-sectional and a rear view, respectively, of a first embodiment according to the present invention.
Figure 2:
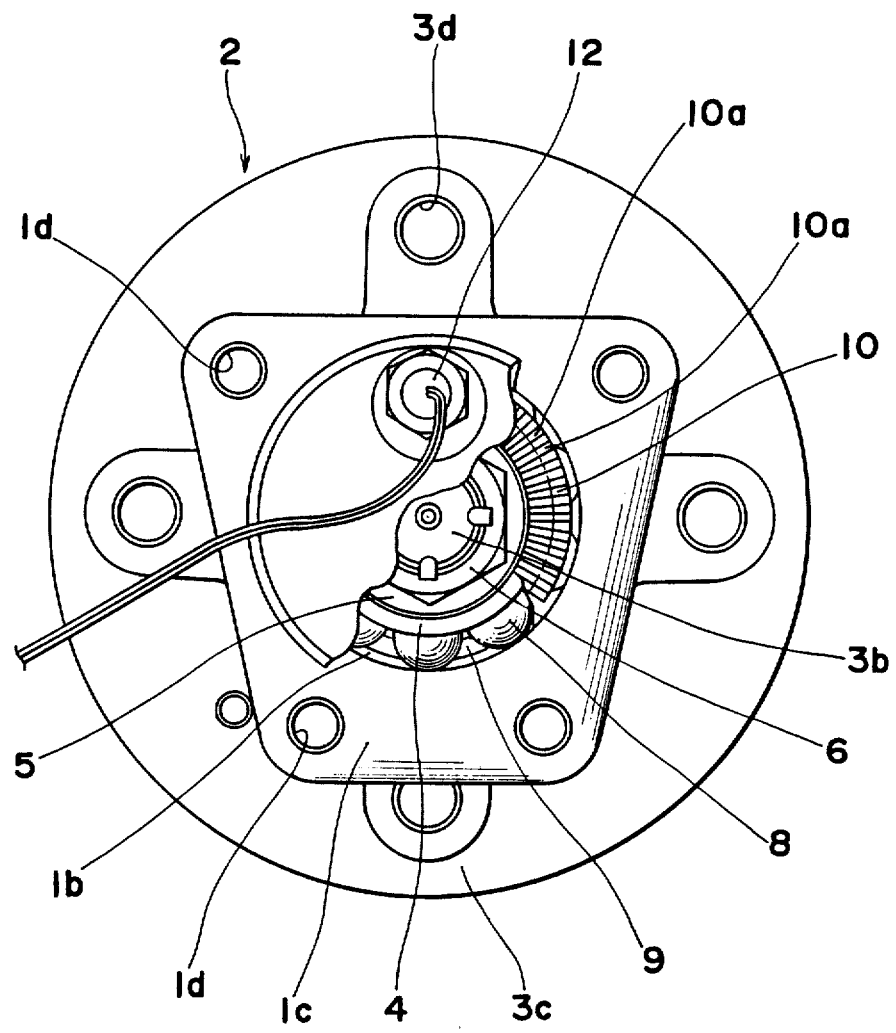

FIG. 1 and FIG. 2 are a vertical cross-sectional view and a front view, respectively, of a first embodiment of an automobile wheel bearing unit according to the present invention in which reference number 1 designates an outer ring mounted on a chassis of an automobile not shown, and 2 an internal member comprising an axle hub 3 which has a flange 3c at one end thereof to which is mounted a wheel (not shown), and an inner ring 4 having a fitting 4a disposed over the other end of axle hub 3. The inner ring 4 is fixed to said axle hub 3 by a washer 5 and nut 6 screwed onto external thread 3b on the other end of axle hub 3. On fitting 4a of said inner ring 4 is secured a pulser 10 in the form of an annular member and projections 10a extending along a rear surface in the radial direction and disposed at uniform intervals in the circumferential direction of the annular member. Furthermore, balls 7, 8 serving as rolling elements are positioned at uniform intervals in a ring pattern in the circumferential direction of the unit by cages 9, 9 located between said outer ring 1 and internal member 2. Said balls 7, 8 are fit, respectively, in opposing races 1a, 3a defined in said outer ring 1 and axle hub 3, and opposing races 1b, 4b defined in outer ring 1 and inner ring 4 so that each ball can roll freely. Cover case 11 is a sealing member fit over the end of the outer ring 1 to cover said nut 6 and pulser 10. Rotational detector 12 is mounted to cover case 11. The rotational detector 12 extends between an inner peripheral surface of said cover case 11 and an outer peripheral surface of said nut 6, and is mounted on cover case 11 with its detector face confronting pulser 10 in the axial direction of the unit. It is to be noted that rotational detector 12 may be of a type that includes a built-in permanent magnet and coil, with a magnetic resistance element, or may be embodied by other various types of detectors, but the type shown in the present embodiment is of the type having a permanent magnet and coil.

The aforementioned outer ring 1 is mounted on the bottom of a strut (not shown) which is mounted on the chassis by bolts (not shown) passing through bolt holes 1d at the four corners of a trapezoidal flange 1c formed at the rear of ring 1. Also, the wheel is mounted to flange 3c of said axle hub 3 by bolts (not shown) passing through four bolt holes 3d. A gap between a front end of outer ring 1 and internal member 2 is sealed by oil seal 14. The oil seal 14 and said cover case 11 completely seal said pulser 10, rotational detector 12 mounted on cover case 11, inner ring 4 inserted in outer ring 1, balls 7, 8, and cages 9, 9 from the exterior.

When the vehicle is driven with the automobile wheel bearing unit according to the present invention, axle hub 3 to which is mounted the wheel and inner ring 4 rotate, and pulser 10 rotates in conjunction therewith. Magnetic flux emanating from the permanent magnet of rotational detector 12 mounted on cover case 11 on the chassis side of the vehicle opposite pulser 10, as taken in the axial direction of the unit, is thus varied by the projections radiating from the pulser. And, a voltage of a frequency proportional to the speed of pulser 10 is produced in the coil of rotational detector 12. Next, the frequency of said voltage output from rotational detector 12 is detected by a detector (not shown) and the speed of the wheel is obtained. At this time, because said pulser 10 and the end of rotational detector 12 are completely sealed from the exterior by cover case 11, oil seal 14, grit, water and other foreign substances cannot penetrate thereto. Thus damage, clogging, or other inteference caused by such substances does not occur, and the speed of the wheel can be detected with high precision over an extended period by pulser 10 and rotational detector 12. Furthermore, because pulser 10 is secured to inner ring 4 and not to the outer ring as in the conventional unit, pulser 10 can be made smaller and lighter, and the wheel bearing unit can therefore be more compact. Furthermore, because pulser 10 is mounted opposite, as taken in the axial direction of the unit, to rotational detector 12 mounted on cover case 11, and is disposed radially inward of outer ring 1, and because the rotational detector 12 is between the inner circumference of cover case 11 and the outer circumference of nut 6, the rotational detector 12 hardly projects from cover case 11. Therefore the wheel bearing unit can be compact. Furthermore, because the diameter of a pitch circle, shown by a dash line in FIG. 2, of projections 10a of pulser 10 is defined at the largest possible location inside cover case 11 when compared with a pulser formed at the outer edge of the nut, it is possible to increase the number of projections 10a, and thereby improve the detection capability of the rotational detector.

Figure 3:
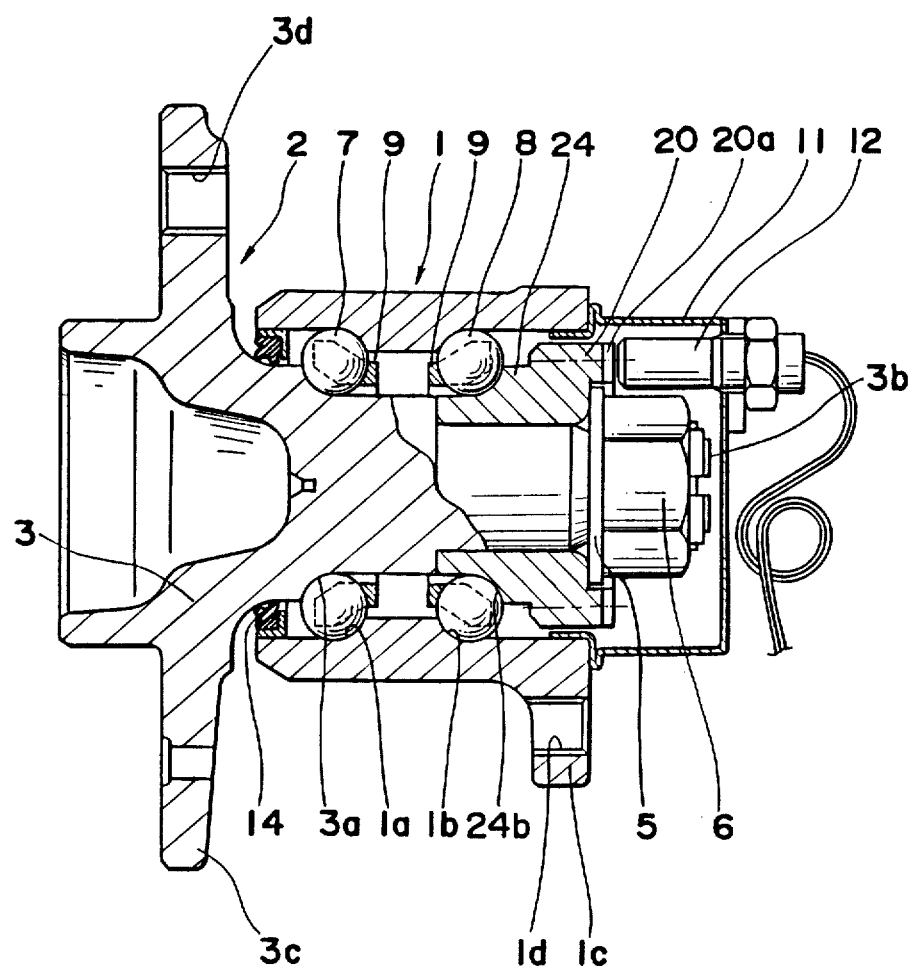
FIG. 3 is a vertical cross-sectional view of an embodiment in which a pulser is integrated with an inner ring.
Figure 6:
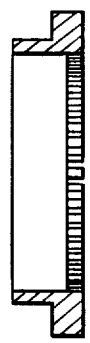
FIGS. 6 and 7 are a vertical cross-sectional and a front view, respectively, of an alternative pulser according to the present invention.
Figure 7:
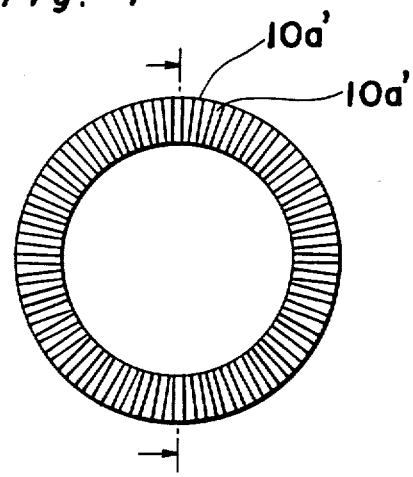

In the first preferred embodiment described, pulser 10 is an annular member and has projections 10a disposed at uniform intervals on an end surface in a radiating pattern and the pulser extends around fitting 4a of inner ring 4. However, similar projections 20a may be directly and integrally formed on an end surface of large diameter section 20 of inner ring 24 as shown in FIG. 3. Furthermore, the pulser may also comprise ring-shaped body having an L-shaped cross section as shown in FIGS. 6 and 7, and projections 10a' formed similarly to those of pulser 10 on an end surface of the body perpendicular to the axis thereof, the pulser being disposed over fitting 4a of inner ring 4.

Figure 4:
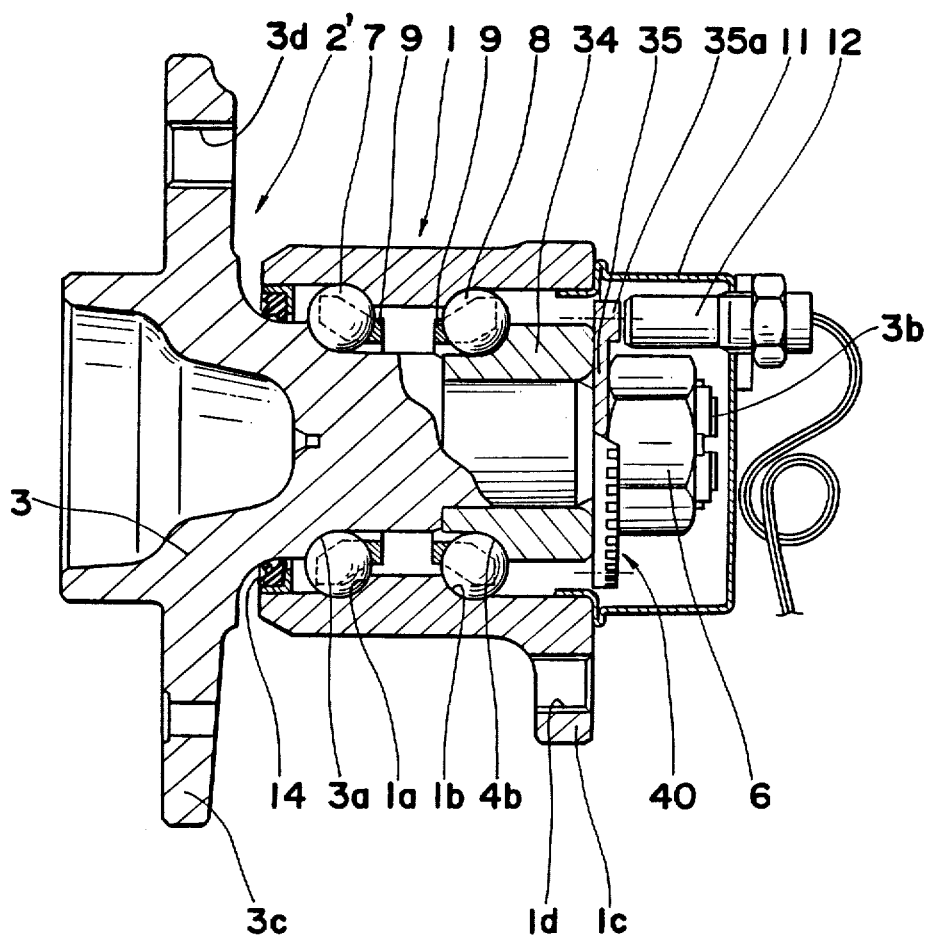
FIGS. 4 and 5 are a vertical cross-sectional and a front view, respectively, of a second embodiment according to the present invention.
Figure 5:
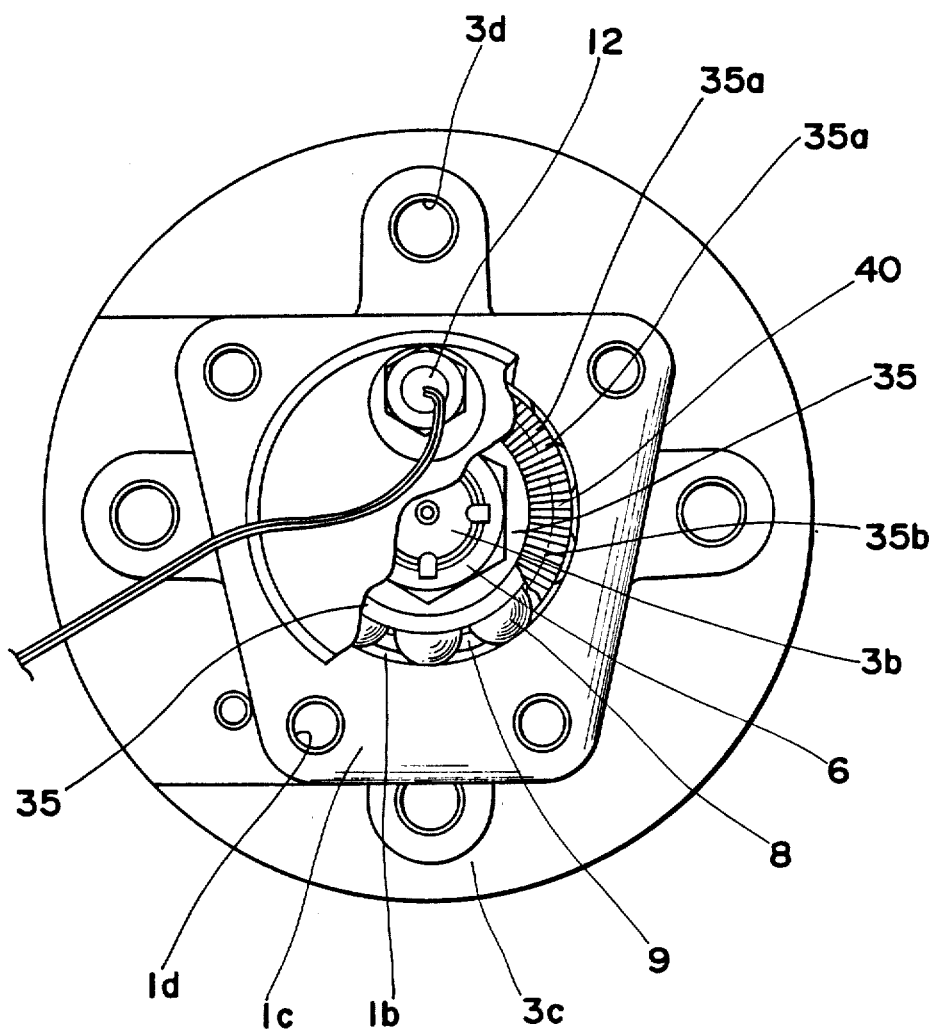
Figure 8:
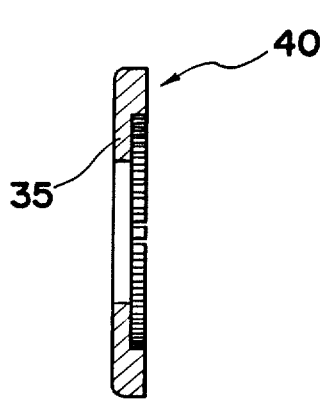
FIGS. 8 and 9 are a vertical cross-sectional and a front view, respectively, of a washer comprising a pulser according to the second embodiment of the present invention.
Figure 9:
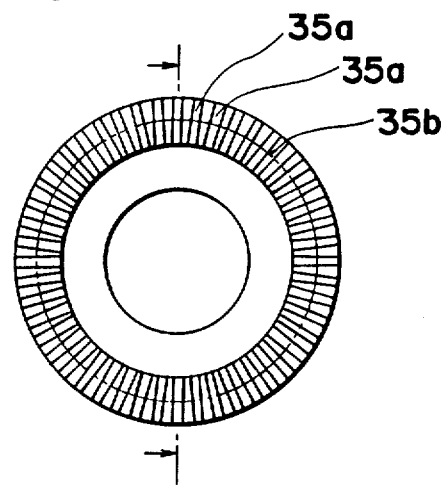
Figure 10:
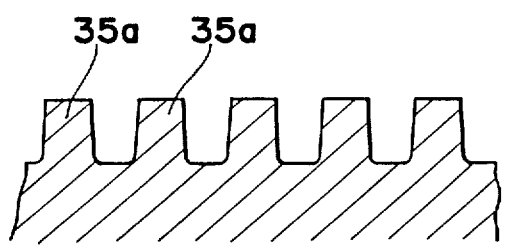
FIG. 10 is an enlaged detailed cross-sectional view of projections at a pitch circle of a pulser of the present invention and FIG. 11 is a vertical cross-sectional view of a conventional automobile wheel bearing unit comprising a rotational speed detector.
Figure 11:
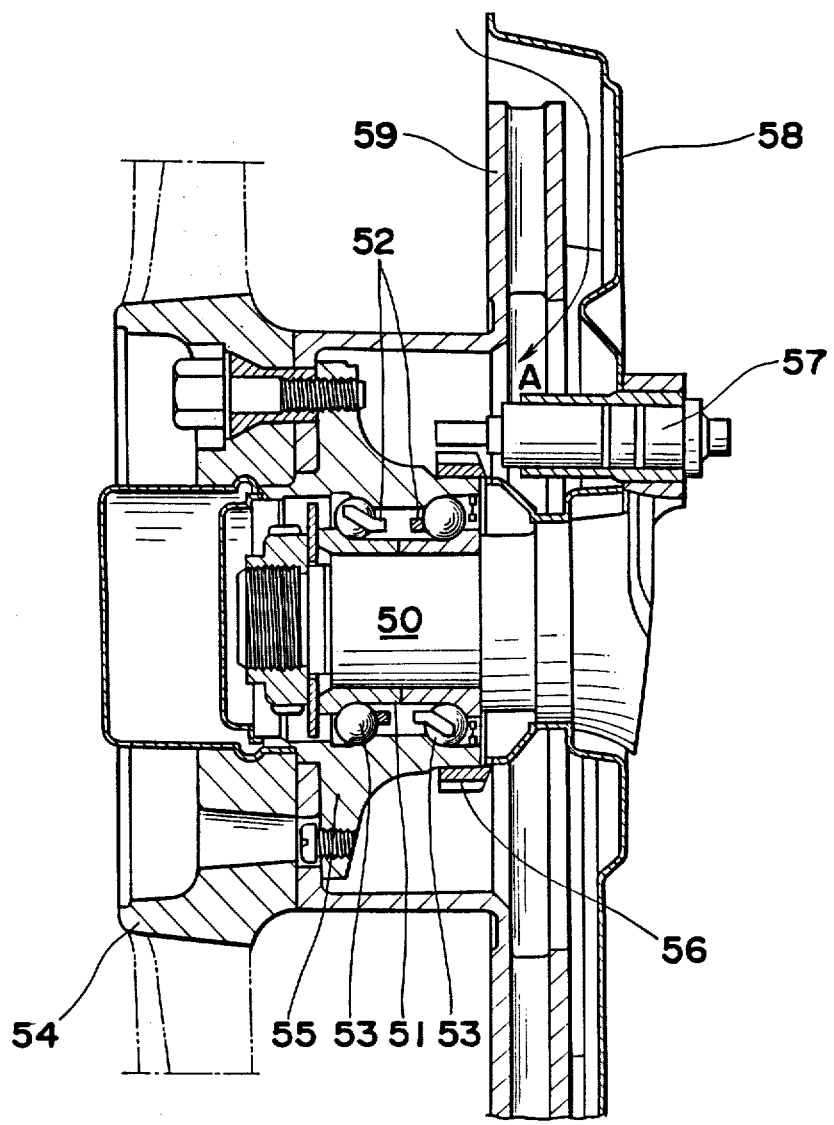

FIG. 4 and FIG. 5 are a vertical cross-sectional and a front view, respectively, of a second embodiment of an automobile wheel bearing unit according to the present invention. Like parts in FIGS. 1, 2, 3, 4 and 5 are identified with like reference numbers, and further description of the like parts is omitted. Reference number 2' designates an internal member comprising axle hub 3 having flange 3c at one end thereof to which is mounted a wheel (not shown). Inner ring 34 is ring-shaped, has a simplified L-shaped cross section and is disposed over the other end of axle hub 3. Said inner ring 34 is mounted to said axle hub 3 by washer 35 and nut 6 screwed to external thread 3b on the other end of said axle hub 3. As shown in FIGS. 8, 9 and 10, at the edge of an outside face of said washer 35 are projections 35a radiating at even intervals similar to pulser 10. Reference number 35b designates a pitch circle of said projections.

When a vehicle is driven with the automobile wheel bearing unit according to the above-described embodiment of the invention, axle hub 3 to which is mounted the wheel and inner ring 34 rotate, and pulser 40 formed on washer 35 rotates in conjunction therewith. Magnetic flux emanating from the permanent magnet of rotational detector 12 mounted on cover case 11 on the chassis side of the vehicle opposite pulser 40, as taken in the axial direction of the unit, is thus varied by the projections radiating from the pulser. And, an AC voltage of a frequency proportional to the speed of pulser 40 is produced in the coil of rotational detector 12.

Next, the frequency of said AC voltage output from rotational detector 12 is detected by a detector (not shown) and the speed of the wheel is obtained. In addition to providing the same aforementioned various advantages of the first embodiment, the embodiment above in which pulser 40 is defined by washer 35 has the advantage of reducing the number of parts and enabling a cost reduction.

In the second embodiment of the present invention, nut 6 and washer 35 constituting pulser 40 are provided separately from each other, but it is also possible to integrally form the nut with the washer constituting said pulser.

As will be apparent from the above description of the present invention, an automobile wheel bearing unit according to the present invention is provided with a sealing member covering a minimum area in which area an annular member confronts a rotational detector which detects a rotational speed of the annular member, thereby preventing the penetration of grit, water and other foreign substances to said area and thereby preventing damage to such an area. Thus, the rotational speed of the wheel over an extended period can be detected with good precision.

Furthermore, because said annular member is provided at an end of an internal member to which is mounted a wheel, said annular member can be made smaller and lighter, and the automobile wheel bearing unit can therefore be more compact when compared with conventional devices in which such an annular member is provided on an external member to which is mounted a wheel. Moreover, because the rotational detector is provided on the external member in such a manner that the rotational sensor is positioned between an inner peripheral surface of the sealing member covering a nut and an outer peripheral surface of the nut and is opposite, as taken in the axial direction of the unit, to the annular member, the rotational detector can be compactly built into the sealing member, and the automobile wheel bearing unit can be made smaller, lighter, and more compact. Furthermore, because the annular member is provided on the internal member and the rotational detector is positioned on the peripheral side of the nut opposite to the annular member to detect the speed of the annular member, it is possible to provide a comparatively larger number of projections on an end surface of the annular member radiating at uniform intervals than when a member is provided on an end face of the nut. Thus the number of pulses generated can be increased thereby making it possible to increase the precision of the detection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automotive vehicle wheel bearing unit comprising:

a cylindrical external member having an outer flange through which the cylindrical external member is to be attached to a chassis of an automotive vehicle;

an internal member having a flange at one end thereof to which a wheel of an automotive vehicle is to be attached, said internal member extending within said external member in an axial direction of the unit;

rolling elements and a cage spacing said rolling elements apart interposed between said cylindrical external member and said internal member, said rolling elements rotatably supporting said internal member relative to said external member;

a nut secured to the other end of said internal member and mounting the internal member to said external member via said rolling elements;

a sealing member fixed to said cylindrical external member and covering said nut;

an annular body extending around said internal member adjacent said nut and fixed relative to said internal member so as to rotate in conjunction therewith, said annular body having a rear surface lying in a plane perpendicular to the axial direction of the unit and facing away from said internal member, and a plurality of projections extending radially along said rear surface and disposed at uniform intervals in the circumferential direction of the annular member; and rotational detector means for detecting the rotational speed of said annular member, said rotational detector means having a front end and a rear end, and said rotational detector means being fixed to said sealing member at said rear end thereof and extending in the axial direction of the unit between an inner peripheral surface of said sealing member and an outer peripheral surface of said nut, the front end of said rotational detector means confronting a respective location past which location said plurality of projections travel when said annular body is rotated in conjunction with said internal member.

2. The automobile wheel bearing unit as claimed in claim 1, wherein said internal member comprises an axle hub, and an inner ring extending around an end of said axle hub and secured thereto by said nut.

3. The automobile wheel bearing unit as claimed in claim 2, wherein said annular body extends around said inner ring.

4. The automobile wheel bearing unit as claimed in claim 2, wherein said annular body is a washer tightened against an end of said inner ring by said nut.

5. The automobile wheel bearing unit as claimed in claim 2, wherein said annular member and said inner ring are unitary.

6. The automobile wheel bearing unit as claimed in claim 1, and further comprising another sealing member extending between said cylindrical external member and said internal member adjacent the flange of said internal member and establishing a seal thereat between the cylindrical external member and the internal member.

* * * * *